United States Patent
Funai et al.

(10) Patent No.: US 11,889,311 B2
(45) Date of Patent: Jan. 30, 2024

(54) RF REPEATER AND METHOD FOR SEMANTIC-LESS RETRANSMISSIONS

(71) Applicant: Raytheon BBN Technologies Corp., Cambridge, MA (US)

(72) Inventors: Colin Fumito Funai, Lincolnwood, IL (US); Laura Jane Poplawski Ma, Somerville, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 44 days.

(21) Appl. No.: 17/537,775

(22) Filed: Nov. 30, 2021

(65) Prior Publication Data

US 2022/0201486 A1 Jun. 23, 2022

Related U.S. Application Data

(60) Provisional application No. 63/127,398, filed on Dec. 18, 2020.

(51) Int. Cl.
*H04W 72/541* (2023.01)
*H04W 12/088* (2021.01)
(Continued)

(52) U.S. Cl.
CPC ...... *H04W 12/088* (2021.01); *H04B 7/15507* (2013.01); *H04W 12/02* (2013.01); *H04W 12/06* (2013.01); *H04W 72/541* (2023.01)

(58) Field of Classification Search
CPC ... H04W 12/088; H04W 12/02; H04W 12/06; H04W 72/541; H04B 7/15507; H04B 7/15528
See application file for complete search history.

(56) References Cited

U.S. PATENT DOCUMENTS 6,356,555 B1 * 3/2002 Rakib .................. H04N 7/10
370/479
7,248,620 B2 * 7/2007 Bott .................. H04B 1/7143
375/135
(Continued)

FOREIGN PATENT DOCUMENTS

CA 2641444 A1 * 8/2007 ........... H04B 7/0413
CN 106301677 A * 1/2017 ........... H04L 1/0079
(Continued)

OTHER PUBLICATIONS

M. Benbaghdad, A. Metref and B. Fergani, "Dual Antenna for Physical layer UHF RFID collision cancelling," 2012 International Conference on Multimedia Computing and Systems, Tangiers, Morocco, 2012, pp. 623-628. (Year: 2012).*

(Continued)

*Primary Examiner* — Yuwen Pan
*Assistant Examiner* — Swati Jain
(74) *Attorney, Agent, or Firm* — Schwegman Lundberg & Woessner, P.A.

(57) ABSTRACT

Embodiments of a radio-frequency (RF) repeater configured for semantic-less retransmissions are described herein. The RF repeater performs physical (PHY) layer processing to identify one or more PHY layer features of a received RF signal. The RF repeater may determine whether or not to retransmit the received RF signal based on the one or more PHY features. The determination to retransmit the received RF signal may be based solely on PHY parameters enabling semantic-less retransmissions.

17 Claims, 4 Drawing Sheets

(51) Int. Cl.
*H04W 12/02* (2009.01)
*H04W 12/06* (2021.01)
*H04B 7/155* (2006.01)

(56) References Cited

U.S. PATENT DOCUMENTS

| | | | | |
|---|---|---|---|---|
| 7,911,985 | B2* | 3/2011 | Proctor, Jr. | H04B 7/15571 370/293 |
| 8,098,726 | B2* | 1/2012 | Lakdawala | H03K 7/10 375/238 |
| 8,396,417 | B2* | 3/2013 | Rofougaran | H04B 7/15507 455/146 |
| 9,948,429 | B2* | 4/2018 | Rost | H04L 1/18 |
| 10,291,541 | B1* | 5/2019 | Sung | H04L 1/1877 |
| 10,530,459 | B2* | 1/2020 | Henry | H04B 7/14 |
| 10,855,398 | B2* | 12/2020 | Handte | H04L 27/3405 |
| 11,055,615 | B2* | 7/2021 | Litichever | H04L 12/40 |
| 2003/0039227 | A1* | 2/2003 | Kwak | H04L 1/0009 370/330 |
| 2004/0141525 | A1* | 7/2004 | Bhushan | H04L 1/1671 370/473 |
| 2006/0291579 | A1* | 12/2006 | Duan | H04L 1/1893 375/264 |
| 2007/0030821 | A1* | 2/2007 | Iwamura | H04L 1/1867 455/560 |
| 2007/0268814 | A1* | 11/2007 | Li | H04L 27/34 370/207 |
| 2007/0286110 | A1* | 12/2007 | Proctor | H04B 7/15521 370/315 |
| 2008/0080436 | A1* | 4/2008 | Sandhu | H04W 52/241 370/328 |
| 2008/0198814 | A1* | 8/2008 | Wengerter | H04W 8/04 370/336 |
| 2010/0281322 | A1* | 11/2010 | Park | H04L 1/0001 714/E11.131 |
| 2012/0159279 | A1* | 6/2012 | Braithwaite | H04W 72/23 714/751 |
| 2013/0235808 | A1* | 9/2013 | Earnshaw | H04L 1/1887 370/329 |
| 2015/0222304 | A1* | 8/2015 | Xu | H04W 24/02 370/329 |
| 2015/0296059 | A1* | 10/2015 | Karri | H04L 1/1812 370/329 |
| 2016/0135049 | A1* | 5/2016 | Banaudha | H04W 12/06 455/411 |
| 2016/0226628 | A1* | 8/2016 | Stephenne | H04L 1/1816 |
| 2018/0191387 | A1* | 7/2018 | Rong | H04B 1/0483 |
| 2019/0045498 | A1* | 2/2019 | Huang | H04B 1/713 |
| 2019/0103893 | A1* | 4/2019 | Lagler | H04B 17/104 |
| 2019/0356425 | A1* | 11/2019 | Dudda | H04L 1/1812 |
| 2020/0067616 | A1* | 2/2020 | Blokh | H04B 17/391 |
| 2020/0120458 | A1* | 4/2020 | Aldana | H04W 4/40 |
| 2020/0288313 | A1* | 9/2020 | Kunz | H04L 63/1466 |
| 2020/0383130 | A1* | 12/2020 | Bar-Or Tillinger | H04W 4/40 |
| 2021/0083794 | A1* | 3/2021 | Agarwal | H04L 5/0048 |
| 2021/0119748 | A1* | 4/2021 | Damnjanovic | H04L 5/0062 |
| 2021/0152284 | A1* | 5/2021 | Handte | H04L 1/0045 |
| 2021/0297128 | A1* | 9/2021 | Badic | H04W 72/20 |
| 2022/0095160 | A1* | 3/2022 | Thelen | H04L 27/261 |
| 2022/0132372 | A1* | 4/2022 | Narasimha | H04W 28/085 |
| 2022/0295492 | A1* | 9/2022 | Shattil | H04L 27/2602 |
| 2022/0368469 | A1* | 11/2022 | Sun | H04L 1/0061 |
| 2023/0075780 | A1* | 3/2023 | Yang | H04L 5/00 |
| 2023/0143144 | A1 | 5/2023 | Funai et al. | |

FOREIGN PATENT DOCUMENTS

| | | | | |
|---|---|---|---|---|
| CN | 114747270 A | * | 7/2022 | |
| EP | 1977535 B1 | * | 8/2018 | H04B 7/155 |
| JP | 2005295190 A | * | 10/2005 | |
| KR | 102242949 B1 | * | 4/2021 | G06F 21/6245 |
| WO | WO-9952308 A1 | * | 10/1999 | H04B 7/155 |
| WO | WO-03019838 A1 | * | 3/2003 | H04L 1/0003 |
| WO | WO-2005034458 A1 | * | 4/2005 | H04L 1/0071 |
| WO | WO-2007086842 A1 | * | 8/2007 | H04B 7/155 |
| WO | WO-2007109041 A2 | * | 9/2007 | H04L 1/0015 |
| WO | WO-2009120626 A1 | * | 10/2009 | H03M 13/356 |
| WO | WO-2019023456 A1 | * | 1/2019 | H04B 1/713 |
| WO | WO-2020243042 A1 | * | 12/2020 | G06F 21/6245 |

OTHER PUBLICATIONS

Vo-Huu, Tien, et al., "Fingerprinting Wi-FI Devices Using Software Defined Radios", Proc. 9th ACM Conf. Security Privacy Wireless Mobile Netw., (2016), 3-14.

Yang, Xue, et al., "An Accuracy-Lossless Perturbation Method for Defending Privacy Attacks in Federated Learning", Network and Distributed Systems Security (NDSS) Symposium arXiv:2002.09843v5 [cs.LG], (Aug. 15, 21), 13 pgs.

Youssef, Khalid, et al., "Machine Learning Approach to RF Transmitter Identi?cation", IEEE Journal of Radio Frequency Identification, vol. 2, No. 4, (Dec. 2018), 197-205.

\* cited by examiner

RF REPEATER AND METHOD FOR SEMANTIC-LESS RETRANSMISSIONS

PRIORITY CLAIM

This application claims the benefit of priority under 35 USC 119(e) to U.S. Provisional Patent Application Ser. No. 63/127,398, filed Dec. 18, 2020 which is incorporated herein by reference in its entirety.

TECHNICAL FIELD

Embodiments pertain to wireless and radio-frequency (RF) communications. Some embodiments relate to RF repeaters. Some embodiments pertain to routers and network communications.

BACKGROUND

The current state of the art for wireless repeaters and routers requires transmissions to be received and decoded by multiple network layers, including at least a physical layer (PHY) and a medium access control layer (MAC), and usually the network layer (NET), before being retransmitted. This results in highly complex routers especially for complex routing protocols. Another issue with current wireless repeaters and routers, besides complexity, is that they are generally configured for a limited number of routing protocols and operate for a limited number of waveforms. Yet another issue with current wireless repeaters and routers is preserving privacy since decoding is performed at the MAC and NET layers and possibly others.

Thus there are general needs for wireless repeaters and routers that are less complex, that are suitable for an unlimited number of routing protocols waveforms, and do not compromise privacy.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments disclosed herein provide a retransmission decision based solely off of the PHY parameters, such as residual indicators from the electromagnetic transmission, IQ samples, and/or LO frequencies. In these embodiments, the complexity needed by contemporary wireless repeaters is reduced allowing for improved retransmission time, reducing environmental noise from the wireless channel, and enabling semantic-less retransmissions.

Some embodiments of the semantic-less wireless repeater disclosed herein utilizes machine learning and launders the wireless signal to remove interferers. Embodiments disclosed herein provide a specific set of mechanisms for deciding whether or not to retransmit a given signal.

In some embodiments, the semantic-less wireless repeater may identify and authenticate transmissions. After authenticating the transmission, PHY layer metrics, such as error magnitude from IQ sample(s), are used to decide whether or not a retransmission is appropriate and necessary. Upon deciding that a retransmission will occur, some embodiments may launder the signal to remove any jamming and/or interference that may have been introduced during the transmission.

Figure 1:
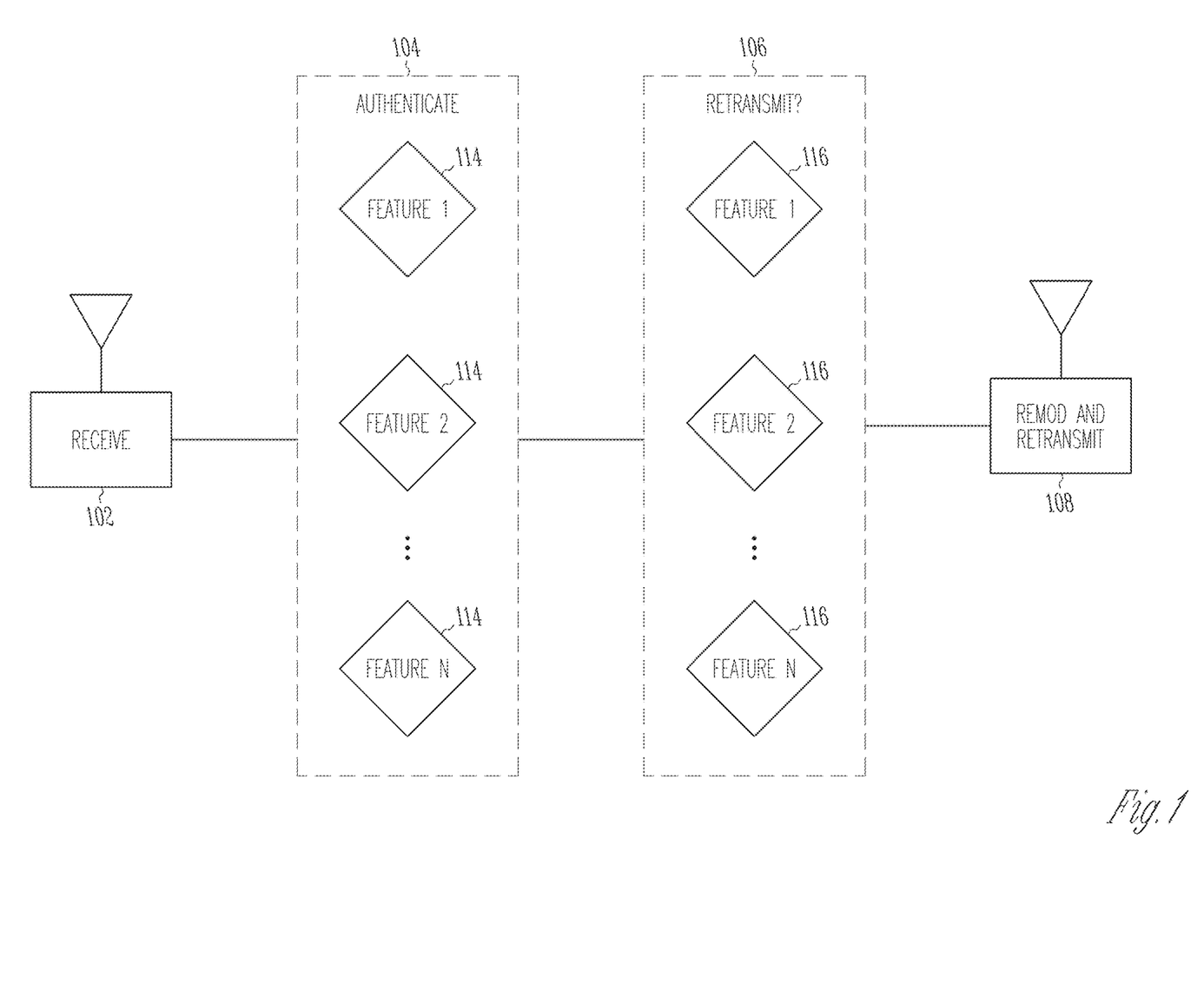
FIG. 1 illustrates an RF repeater configured for semantic-less retransmissions in accordance with some embodiments.

FIG. 1 illustrates an RF repeater configured for semantic-less retransmissions in accordance with some embodiments. The RF repeater may include receiver circuitry 102 to demodulate the received RF signal, authentication circuitry 104 to authenticate the received RF signal based on one or more authentication features 114 and retransmission determination circuitry 106 to determine whether or not to retransmit the received RF signal based on one or more retransmission features 116. The RF repeater may also include remodulation and retransmission circuitry 108 to remodulate and retransmit the received RF signal. These embodiments are described in more detail below.

The RF repeater may also include one or more antennas. The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the RF repeater 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Some embodiments described herein are directed to a radio-frequency (RF) repeater configured for semantic-less retransmissions. The RF repeater may be configured to perform physical (PHY) layer processing to identify one or more PHY layer features of a received RF signal. The RF repeater may determine whether or not to retransmit the received RF signal based on the one or more PHY features. In these embodiments, the determination to retransmit the received RF signal may be based solely on PHY parameters enabling semantic-less retransmissions.

In some embodiments, the RF repeater may refrain from performing any medium access control (MAC) layer processing or other higher-layer processing to determine whether or not to retransmit the received RF signal. In some embodiments, to refrain from performing MAC layer processing, the RF repeater may refrain from bit parsing, decoding or reading packet headers and IP addresses to determine whether to retransmit the RF signal. In these embodiments, MAC layer processing is not performed and the received RF signal may be retransmitted regardless of the underlying protocol.

In some embodiments, the RF repeater may authenticate the received RF signal based on one or more authentication features 114 (i.e., features 1-N used for authentication). In these embodiments, if the received RF signal is authenticated, the RF repeater may determine whether or not to retransmit the received RF signal based on one or more retransmission features 116 (i.e., features 1-N used for authentication). In these embodiments, the RF repeater may refrain from retransmitting the received RF signal when not authenticated. In these embodiments, the one or more authentication features 114 and the one or more retransmission features 116 may be stored in memory.

In some embodiments, the RF repeater may determine which set of RF signals to retransmit and which set of RF signals not to retransmit based on authentication. In some of these embodiments, the RF repeater may include authentication circuitry 104 to authenticate the received RF signal based on one or more authentication features 114 and retransmission determination circuitry 106 to determine whether or not to retransmit the received RF signal based on one or more retransmission features 116. In these embodiments, the received RF signal may be authenticated based on a first set of features 114 (e.g., frequency error or offset) and the decision to retransmit may be based on a second set of features 116. In some of these embodiments, the memory may store the identities or characteristics of devices whose signals will be retransmitted.

In some embodiments, the RF repeater may determine the one or more authentication features 114 using in-phase (I) and quadrature-phase (Q) samples generated from the received RF signal. In these embodiments, the one or more authentication features 114 comprise an error vector magnitude of the I and Q samples (e.g., an I-Q symbol error) and a local-oscillator (LO) signal presence in the received RF signal, although the scope of the embodiments is not limited in this respect. In these embodiments, the RF repeater may authenticate the received RF signal when the error vector magnitude of the I and Q samples is below a predetermined threshold and/or based on a ratio of the LO signal level to the RF signal level (e.g., a ratio or quantity of the LO that may be present in the received RF signal).

In some embodiments, the one or more authentication features 114 further comprise: modulation type, a chip rate, a chip-set identifier, a signal rise time, an I-Q symbol error, and local-oscillator (LO) signal presence. In some of these embodiments, characteristics of the I and Q samples may be used to authenticate the received RF signal, although the scope of the embodiments is not limited in this respect. The characteristics, for example, may include frequency error or offset, although the scope of the embodiments is not limited in this respect. In these embodiments, the characteristics of the I and Q samples may be used to authenticate the received RF signal and identify the transmitter (i.e., authenticate the sender). In these embodiments, examples of the modulation type used for authentication may comprise QPSK vs QAM, Frequency Hopping vs Direct Sequence Spread Spectrum, etc.

In some embodiments, characteristics that are not based on I and Q samples may be used to authenticate the received RF signal. In these embodiments, an LO offset may be used, for example, although the scope of the embodiments is not limited in this respect as other authentication features may also be used. In some embodiments, the RF repeater may authenticate the received RF signal based on RF fingerprinting using an RF machine learning (RFML) technique using the I and Q samples.

In some embodiments, the retransmission features 116 may comprise at least one of an I-Q sample region and a signal-to-noise ratio (SNR) of the received RF signal. In these embodiments, the RF repeater may determine whether or not to retransmit the received RF signal, based on for example, when the I and Q samples of the received RF signal fall within the I-Q sample region, and when the SNR of the received RF signal is within a predetermined SNR range.

In some embodiments, the RF repeater may retransmit if the I and Q samples fall within specific region (see region 402 of FIG. 4 described in more detail below). For example, based on the I and Q samples, the processing circuitry may determine if the RF repeater is too close to the actual sender and therefore there may be no need to retransmit the RF signal. On the other hand, based on the I and Q samples, the processing circuitry may determine if the RF repeater is far enough away from the actual sender and therefore may retransmit the RF signal. Based on the I and Q samples, the processing circuitry may also determine if the RF repeater is too far enough away from the intended recipient and therefore may refrain from retransmission of the RF signal.

In some embodiments, prior to remodulation of the I and Q samples for retransmission of the received RF signal, the RF repeater may process the I and Q samples to remove noise and interference, although the scope of the embodiments is not limited in this respect. In these embodiments, the remodulation and retransmission circuitry 108 of the RF repeater may be configured to remodulate the I and Q samples for retransmission of the received RF signal after processing the I and Q samples to remove noise and interference. In these embodiments, the remodulation and retransmission circuitry 108 may reduce or remove noise and interference when remodulating prior to retransmission. In these embodiments, the received RF signal may be laundered as any jamming signals or interferers may be removed.

In some embodiments, the receiver circuitry 102 may demodulate the received RF signal to generate the I and Q samples of the received RF signal.

In some embodiments, the RF repeater may be configured for operation as a node in a multi-hop network. In these embodiments, the RF repeater may route (i.e., retransmit) the received RF signal to a next-hop node) when authenticated based solely on the PHY layer features. In these multi-hop embodiments, routing the received RF signal to a next-hop node comprises retransmitting the RF signal non-directionally or directionally. In these multi-hop embodiments, RF signals are authenticated at each hop of the multi-hop network. This allows for authentication of network users and increases network resilience, although the scope of the embodiments is not limited in this respect.

In some embodiments, processing elements of the RF repeater may comprise an FPGA. In some embodiments, the elements of the RF repeater may be fabricated as part of an Application Specific Integrated Circuit (ASIC) or Radio Frequency Integrated Circuit (RFIC), although the scope of the embodiments is not limited in this respect.

Figure 2:
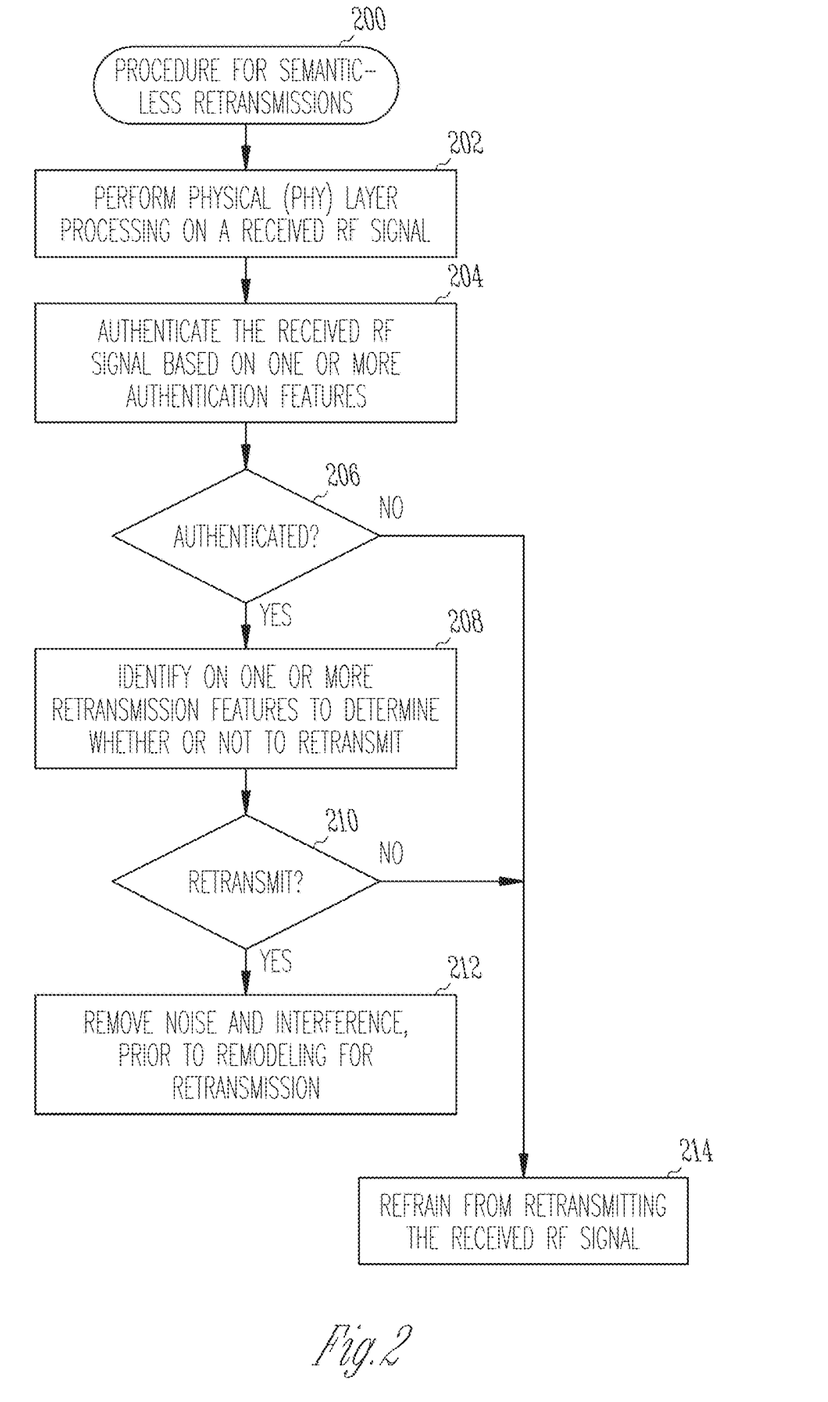
FIG. 2 is a flow chart illustrating operations performed by an RF repeater configured for semantic-less retransmissions in accordance with some embodiments.

Some embodiments are directed to a method for semantic-less retransmissions (e.g., see FIG. 2). The method may include performing physical (PHY) layer processing to identify one or more PHY layer features of a received RF signal and determining whether or not to retransmit the received RF signal based on the one or more PHY features. In some of these embodiments, performing the PHY layer processing may comprise generating in-phase (I) and quadrature-phase (Q) samples of the received RF signal, although the scope of these embodiments is not limited in this respect. In some embodiments, the method may include authenticating the received RF signal based on one or more authentication features 114 determined from the I and Q samples. In some of these embodiments, if the received RF signal is authenticated, the method may include determining whether or not to retransmit the received RF signal based on one or more retransmission features determined from the I and Q samples.

Some embodiments are directed to a non-transitory computer-readable storage medium that stores instructions for execution by processing circuitry of an RF repeater configured for semantic-less retransmissions. These embodiments are described in more detail below.

FIG. 2 is a flow chart illustrating operations performed by an RF repeater configured for semantic-less retransmissions in accordance with some embodiments. The procedure for semantic-less retransmissions 200 illustrated in FIG. 2 may be performed by an RF repeater, such as the RF repeater illustrated in FIG. 1, although other RF repeater configurations may be suitable.

In operation 202, PHY layer processing is performed on a received RF signal to identify one or more PHY layer features of a received RF signal. In some embodiments, performing the PHY layer processing may generating in-phase (I) and quadrature-phase (Q) samples of the received RF signal, although the scope of the embodiments is not limited in this respect.

In operation 204, the received RF signal may be authenticated based on one or more authentication features. If the RF signal is authenticated (operation 206), operation 208 may be performed. If the RF is not authenticated, operation 214 may be performed. In some embodiments, one or more authentication features may be determined from the I and Q samples In operation 208, one or more retransmission features are identified to determine whether or not to retransmit. Based on the identified retransmission features (operation 210), operation 212 may be performed when it is determined to retransmit the received RF signal, and operation 214 may be performed when it is determined not to retransmit the received RF signal.

In operation 212, the received RF signal is remodulated for retransmission, and interference and noise may be removed.

In operation 214, the RF repeater may refrain from retransmitting the received RF signal.

Figure 3:
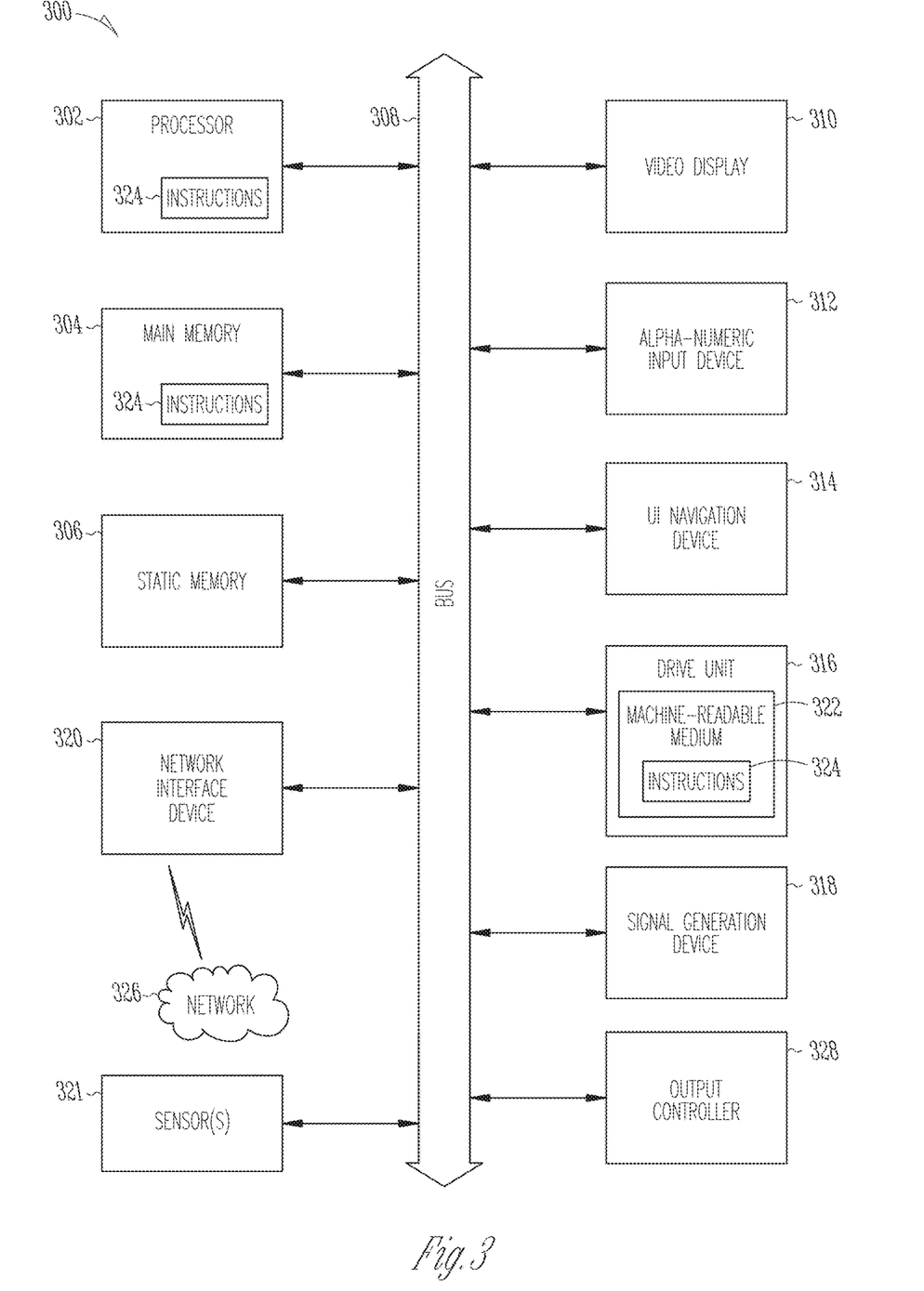
FIG. 3 illustrates a processing system in accordance with some embodiments.

FIG. 3 illustrates a block diagram of an example processing system 300 upon which any one or more of the techniques (e.g., methodologies) discussed herein may perform. In some embodiments, processing system 300 may operate as part of RF repeater 100 (FIG. 1). In alternative embodiments, the processing system 300 may operate as a standalone device or may be connected (e.g., networked) to other machines. In a networked deployment, the processing system 300 may operate in the capacity of a server machine, a client machine, or both in server-client network environments. In an example, the processing system 300 may act as a peer machine in peer-to-peer (P2P) (or other distributed) network environment. The processing system 300 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a non-transitory computer-readable storage medium. In an example, the software, when executed by the underlying hardware of the module, causes the hardware to perform the specified operations. In some embodiments, the non-transitory computer-readable storage medium may store instructions for execution by one or more processors or processing circuitry, to perform the operations described herein.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Processing system 300 may include processing circuitry such as a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The processing system 300 may further include a display unit 310, an alphanumeric input device 312 (e.g., a keyboard), and a user interface (UI) navigation device 314 (e.g., a mouse). In an example, the display unit 310, input device 312 and UI navigation device 314 may be a touch screen display. The processing system 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The processing system 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the processing system 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any non-transitory medium that is capable of storing, encoding, or carrying instructions for execution by the processing system 300 and that cause the processing system 300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks, among others. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input multiple-output (SIMO), multiple-input multiple-output (MIMO), or multiple-input single-output (M ISO) techniques. In some examples, the network interface device 320 may wirelessly communicate using Multiple User MIMO techniques. The term "transmission medium" shall be taken to include any tangible medium that is capable of storing, encoding or carrying instructions for execution by the processing system 300, and includes digital or analog communications signals or other tangible medium to facilitate communication of such software.

Figure 4:
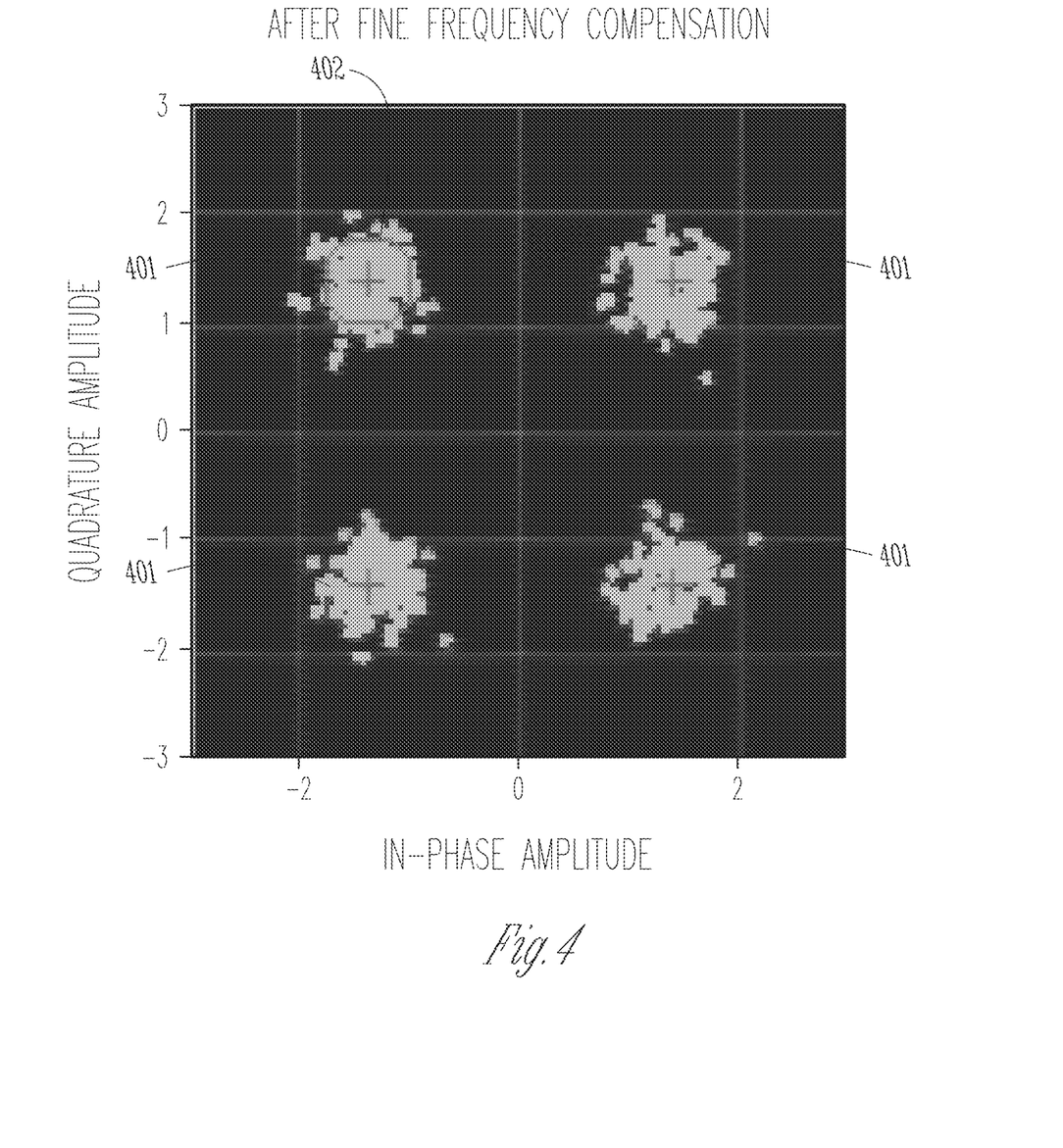
FIG. 4 shows an I-Q sample region for use in determining whether or not to retransmit a received RF signal, in accordance with some embodiments.

FIG. 4 shows an I-Q sample region for use in determining whether or not to retransmit a received RF signal, in accordance with some embodiments. In these embodiments, when the I-Q samples 401 of a received RF signal reside within region 402, the processing circuitry may configure the RF repeater to retransmit the received RF signal once authenticated. When the I-Q samples of a received RF signal reside outside region 402, the processing circuitry may configure the RF repeater to refrain from retransmitting the received RF signal. Region 402 may be based on an amount of error that is to be accommodated, although the scope of the embodiments is not limited in this respect.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A radio-frequency (RF) repeater configured for semantic-less retransmissions, the RF repeater comprising:
   processing circuitry; and memory,
   wherein the processing circuitry is to:
   perform physical (PHY) layer processing to identify one or more residual indicators present in a received RF signal; and
   determine whether or not to retransmit the received RF signal based solely on the one or more residual indicators,
   wherein the residual indicators result from an electromagnetic transmission of the received RF signal by a transmitter performing one or more of upconversion, modulation and amplification,
   wherein the processing circuitry is to refrain from performing processing at any one or more logical layers higher than a PHY layer, including refraining from performing medium access control (MAC) layer processing to determine whether or not to retransmit the received RF signal,
   wherein the processing circuitry is to:
   authenticate the received RF signal based on one or more authentication features determined from the residual indicators;
   determine, if the received RF signal is authenticated, whether or not to retransmit the received RF signal based on one or more retransmission features determined from the residual indicators; and
   refrain from retransmitting the received RF signal when not authenticated, wherein the one or more authentication features and the one or more retransmission features are stored in the memory.

2. The RF repeater of claim 1, wherein to refrain from performing MAC layer processing, the processing circuitry is to refrain from bit parsing, decoding or reading packet headers and IP addresses to determine whether to retransmit the RF signal.

3. The RF repeater of claim 1, wherein the processing circuitry is further configured to determine the one or more authentication features using in-phase (I) and quadrature-phase (Q) samples generated from the received RF signal, and
wherein the one or more authentication features comprise an error vector magnitude of the I and Q samples and a local-oscillator (LO) signal presence in the received RF signal.

4. The RF repeater of claim 3, wherein the one or more authentication features further comprise one or more of: a modulation type, a chip rate, a chip-set identifier, a signal rise time, and an I-Q symbol error determined from the received RF signal.

5. The RF repeater of claim 3, wherein the processing circuitry is further configured to authenticate the received RF signal based on RF fingerprinting using an RF machine learning (RFML) technique using the I and Q samples.

6. The RF repeater of claim 3, wherein the retransmission features comprise: an I-Q sample region and a signal-to-noise ratio (SNR) of the received RF signal,
wherein the processing circuitry is configured to determine whether or not to retransmit the received RF signal:
when the I and Q samples of the received RF signal fall within the I-Q sample region, and
when the SNR of the received RF signal is within a predetermined SNR range.

7. The RF repeater of claim 6, wherein prior to remodulation of the I and Q samples for retransmission of the received RF signal, the processing circuitry is to process the I and Q samples to remove noise and interference.

8. The RF repeater of claim 3, wherein the RF repeater further comprises receiver circuitry to demodulate the received RF signal to generate the I and Q samples of the received RF signal, and
wherein the processing circuitry comprises a baseband processor.

9. The RF repeater of claim 3, wherein the RF repeater is configured for operation as a node in a multi-hop network, the processing circuitry is configured to cause the RF repeater to route the received RF signal to a next-hop node when authenticated based on the residual indicators.

10. The RF repeater of claim 1, wherein the processing circuitry and memory comprises a field-programmable gate array (FPGA).

11. A method for semantic-less retransmissions comprising:
performing physical (PHY) layer processing to identify one or more residual indicators present in a received RF signal; and
determining whether or not to retransmit the received RF signal based on the one or more residual indicators,
wherein the residual indicators result from an electromagnetic transmission of the received RF signal by a transmitter performing one or more of upconversion, modulation and amplification,
wherein the method further comprises:
refraining from performing processing at any one or more logical layers higher than a PHY layer, including refraining from performing medium access control (MAC) layer processing to determine whether or not to retransmit the received RF signal;
authenticating the received RF signal based on one or more authentication features determined from the residual indicators;
determining, if the received RF signal is authenticated, whether or not to retransmit the received RF signal based on one or more retransmission features determined from the residual indicators; and
refraining from retransmitting the received RF signal when not authenticated.

12. The method of claim 11, wherein performing the PHY layer processing comprises generating in-phase W and quadrature-phase (Q) samples of the received RF signal, and
wherein the method comprises:
authenticating the received RF signal based on one or more authentication features determined from the residual indicators determined from the I and Q samples; and
if the received RF signal is authenticated, determining whether or not to retransmit the received RF signal based on one or more retransmission features determined from the residual indicators determined from the I and Q samples.

13. The method of claim 12, wherein the one or more authentication features comprise an error vector magnitude of the I and Q samples and a local-oscillator (LO) signal presence in the received RF signal.

14. The method of claim 13, wherein the retransmission features comprise: an I-Q sample region and a signal-to-noise ratio (SNR) of the received RF signal,
wherein the method further comprises determining whether or not to retransmit the received RF signal:
when the I and Q samples of the received RF signal fall within the I-Q sample region, and
when the SNR of the received RF signal is within a predetermined SNR range.

15. The method of claim 14, further comprising:
processing the I and Q samples to remove noise and interference; and
re modulating the I and Q samples for retransmission of the received RF signal after processing.

16. A non-transitory computer-readable storage medium that stores instructions for execution by processing circuitry of an RF repeater configured for semantic-less retransmissions, wherein the processing circuitry is configured to:
perform physical (PHY) layer processing to identify one or more residual indicators present in of a received RF signal; and
determine whether or not to retransmit the received RF signal based on the one or more residual indicators,
wherein the residual indicators result from an electromagnetic transmission of the received RF signal by a transmitter performing one or more of upconversion, modulation and amplification,
wherein the processing circuitry is to:
refrain from performing processing at any one or more logical layers higher than a PHY layer, including refraining from performing medium access control (MAC) layer processing to determine whether or not to retransmit the received RF signal;
authenticate the received RF signal based on one or more authentication features determined from the residual indicators;

determine, if the received RF signal is authenticated, whether or not to retransmit the received RF signal based on one or more retransmission features determined from the residual indicators; and refrain from retransmitting the received RF signal when not authenticated.

17. The non-transitory computer-readable storage medium of claim 16, wherein the processing circuitry is further configured to determine the one or more authentication features using in-phase (I) and quadrature-phase (Q) samples generated from the received RF signal, wherein the one or more authentication features comprise an error vector magnitude of the I and Q samples and a local-oscillator (LO) signal presence in the received RF signal, wherein the retransmission features comprise: an I-Q sample region and a signal-to-noise ratio (SNR) of the received RF signal, wherein the processing circuitry is configured to determine whether or not to retransmit the received RF signal:

when the I and Q samples of the received RF signal fall within the I-Q sample region, and when the SNR of the received RF signal is within a predetermined SNR range.

* * * * *

UNITED STATES PATENT AND TRADEMARK OFFICE
CERTIFICATE OF CORRECTION

| | | |
|---|---|---|
| PATENT NO. | : 11,889,311 B2 | Page 1 of 1 |
| APPLICATION NO. | : 17/537775 | |
| DATED | : January 30, 2024 | |
| INVENTOR(S) | : Funai et al. | |

It is certified that error appears in the above-identified patent and that said Letters Patent is hereby corrected as shown below:

In the Specification

In Column 8, Line 8, delete "(M ISO)" and insert --(MISO)-- therefor

In the Claims

In Column 10, Line 16, in Claim 12, delete "Wand" and insert --(I) and-- therefor In Column 10, Line 44, in Claim 15, delete "re modulating" and insert --remodulating-- therefor In Column 10, Line 51, in Claim 16, after "in", delete "of"

Signed and Sealed this
Seventeenth Day of December, 2024

Derrick Brent
*Acting Director of the United States Patent and Trademark Office*